United States Patent
Lee et al.

(10) Patent No.: US 12,477,396 B2
(45) Date of Patent: Nov. 18, 2025

(54) METHOD, MEDIUM, AND SYSTEM FOR PREDICTIVE RADIO ACCESS MANAGEMENT WITH UNIFIED ACCESS AND TRANSMISSION GRANT MESSAGING

(71) Applicant: Verizon Patent and Licensing Inc., Basking Ridge, NJ (US)

(72) Inventors: Jay J. Lee, San Ramon, CA (US); Thomas W. Haynes, Clayton, CA (US); Joseph Lee, Frisco, TX (US); Kent W. Hughes, Oakland, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 446 days.

(21) Appl. No.: 17/814,616

(22) Filed: Jul. 25, 2022

(65) Prior Publication Data

US 2024/0031867 A1    Jan. 25, 2024

(51) Int. Cl.
*H04W 28/08* (2023.01)
*H04W 72/23* (2023.01)
*H04W 72/52* (2023.01)
*H04W 74/0833* (2024.01)
*H04W 72/0446* (2023.01)
*H04W 72/21* (2023.01)

(52) U.S. Cl.
CPC ... *H04W 28/0942* (2020.05); *H04W 28/0858* (2020.05); *H04W 72/23* (2023.01); *H04W 74/0841* (2013.01); *H04W 72/0446* (2013.01); *H04W 72/21* (2023.01); *H04W 72/52* (2023.01)

(58) Field of Classification Search
CPC ......... H04W 28/0942; H04W 28/0858; H04W 72/23; H04W 72/21; H04W 72/52; H04W 72/0446; H04W 74/0841
See application file for complete search history.

(56) References Cited

U.S. PATENT DOCUMENTS

| | | | |
|---|---|---|---|
| 2021/0360468 A1* | 11/2021 | Nieto Aliques ... | H04W 28/0865 |
| 2022/0150915 A1* | 5/2022 | Terabe ................ | H04W 72/54 |
| 2023/0292291 A1* | 9/2023 | Huang ................ | H04W 24/02 |

OTHER PUBLICATIONS

3GPP TR 21.915 version 15.0.0 Release 15 titled Digital cellular telecommunications system (Phase 2+) (GSM); Universal Mobile Telecommunications System (UMTS); LTE; 5G; Release description; Release 15 (Year: 2019).*

* cited by examiner

*Primary Examiner* — Ayaz R Sheikh
*Assistant Examiner* — Christopher R Davis

(57) ABSTRACT

A method, a network device, and a non-transitory computer-readable storage medium are described in relation to an radio access management service. The radio access management service may include calculating a predicted total resource allocation value for a prospective access and transmission grant associated with a prospective time window, and a value indicating a number of end devices that can be supported. The service may generate and transmit an access and transmission grant message directed to end devices, based on the value, in which the message may include both random access response information and contention resolution information.

20 Claims, 7 Drawing Sheets

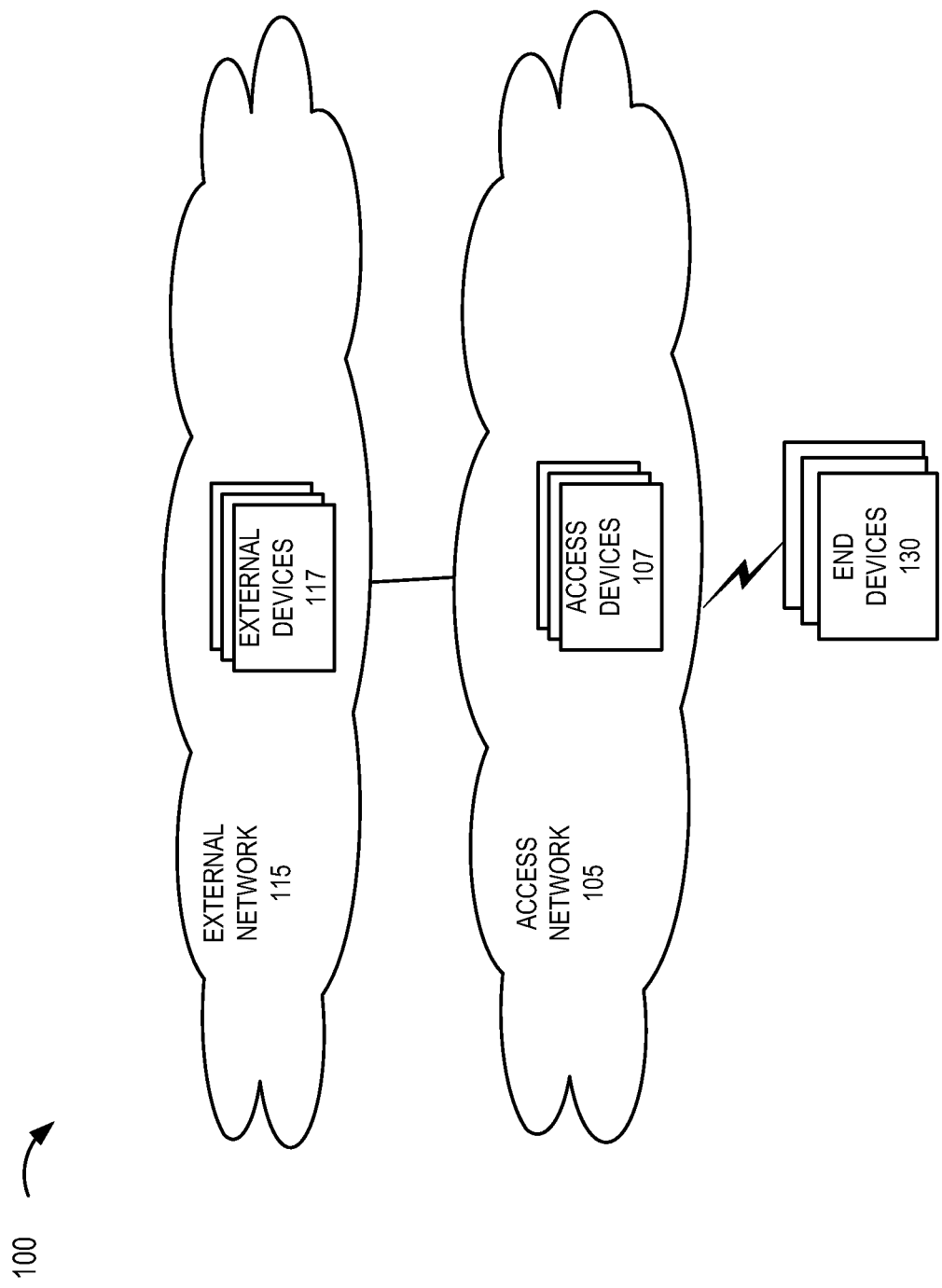

METHOD, MEDIUM, AND SYSTEM FOR PREDICTIVE RADIO ACCESS MANAGEMENT WITH UNIFIED ACCESS AND TRANSMISSION GRANT MESSAGING

BACKGROUND

Development and design of networks present certain challenges from a network-side perspective and an end device perspective. For example, Next Generation (NG) wireless networks, such as Fifth Generation New Radio (5G NR) networks are being deployed and under development.

BRIEF DESCRIPTION OF THE DRAWINGS

FIG. 1 is a diagram illustrating an exemplary environment in which an exemplary embodiment of a radio access management service may be implemented;

DETAILED DESCRIPTION

Figure 2A:
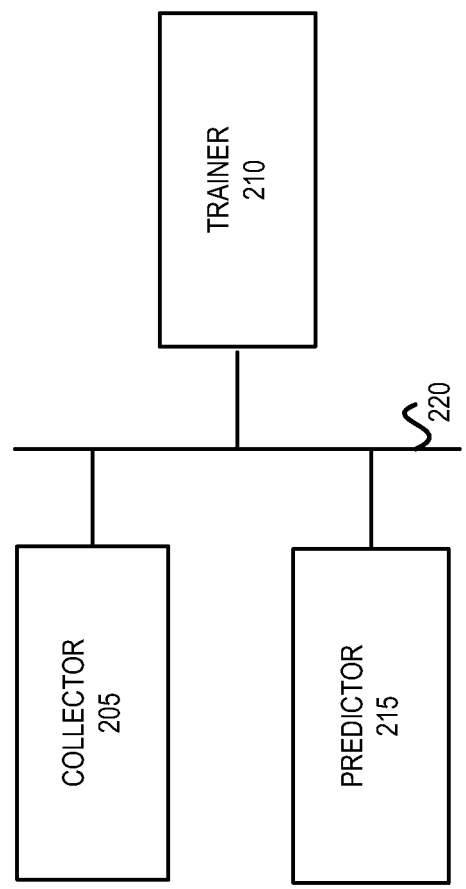
FIG. 2A is a diagram illustrating exemplary components of a network device according to an exemplary embodiment of the radio access management service.

The following detailed description refers to the accompanying drawings. The same reference numbers in different drawings may identify the same or similar elements. Also, the following detailed description does not limit the invention.

The deployment of Internet of Things (IoT) devices, massive IoT (mIoT) devices, and the like in radio/cellular networks present challenges to a random access (RA) process. For example, the mIoT deployment may be significantly dense in a geographically constrained area, such as in a cell, sector, or sub-sector area. As a consequence, due to the handshaking that occurs between each IoT device and a radio access network (RAN) device, such as a next generation Node B (gNB), an evolved Node B (eNB), or the like, during the RA process, the probability of collisions in RA requests among the mIoT devices is significantly high. While the allocation of RA slots in the uplink may be increased to address this issue, this approach has limitations because uplink resources are shared between the RA process and uplink data transmissions. Accordingly, an increase of RA resource allocation results in a decrease of available resources for uplink transmissions, and vice versa. The collisions between RA requests leads to waste of resources and prolonged delays because the affected IoT devices will have to wait until a next RA opportunity.

In addition, the signaling overhead for RA is quite high. Compared to conventional cellular services, mIoT services send small number of bits of data to the RAN device. In the traditional RA process, when the user wants to transmit the data, each IoT device must select one RA slot to send a scheduling request to the RAN device. In the frequency domain, each RA slot is 1.08 MHz, which is equal to six Resource Blocks (RBs), and each RB is a frequency-time unit with 180 kHz and 1 millisecond duration. In this example, using one RA slot (or six RBs) for sending a scheduling request to transmit a short data packet that requires only one RB yields a highly inefficient use of network resources, especially when considering massive number of IoT devices. Further, given the number of IoT devices, for example, periodic or random bursts of RA requests can cause uncontrollable congestion in the uplink channel in the RAN device and the RAN.

According to exemplary embodiments, a radio access management service is described. According to an exemplary embodiment, the radio access management service may provide resource reservation and/or pre-allocation of radio resources for end devices. For example, a RAN device may pre-allocate resources to a set of mIoT devices and send (e.g., multicast or broadcast) an access and transmission grant to such mIoT devices. According to an exemplary embodiment, the RAN device may transmit a single-access and transmission grant that includes both RA information and contention resolution information based on predictive values and pre-allocation of radio resources, as described herein. In this way, signaling overhead may be significantly reduced based on the omission of transmitting and receiving certain messages (e.g., RA request, RA response, contention request, etc.), as described herein. Upon receiving the access and transmission grant, if the IoT device has data to transmit, the IoT device may transmit the data using the pre-allocated resources and scheduled timeslot. Based on this procedure, the radio access management service may avoid collisions among end devices for access grant, as well as provide other types of improvements, such as minimizing prolonged delays, abrupt congestion, excessive signaling overhead, and improving network resource utilization, for example.

According to an exemplary embodiment, the radio access management service may include a machine learning and/or artificial intelligence (ML/AI) service, as described herein. According to an exemplary embodiment, the ML/AI service may predict various metrics that allows the service to calculate resource reservation and/or pre-allocation, as described herein. According to some exemplary embodiments, the radio resource management service may use a time window method approach in which data may be collected and used to calculate resource reservations for end devices, such as IoT devices, as described herein. According to an exemplary embodiment, the time window method may include calculating the total radio channel capacity between a RAN device and the end devices, calculating predicted throughputs that may be used by the end devices (e.g., IoT devices, non-IoT devices), calculating an average throughput for the end devices, calculating the resources for the end devices (e.g., IoT devices, non-IoT devices), calculating the number of a set of the end devices (e.g., IoT devices), and sending access grants to the set of the end devices and potentially end devices that are not part of the set.

In view of the foregoing, the radio access management service may avoid or minimize excessive signaling associated with a radio access procedure, prolonged delays to establish a radio connection, potential congestion, and inefficient use of resources (e.g., network, end device, etc.). The radio access management service may pre-allocate or reserve radio resources to end devices (e.g., mIoT devices or other types of end devices) of a given coverage area in advance (e.g., in advance of receipt of RA requests) such that a radio access procedure is simplified and may eliminate or minimize such deficiencies associated with current radio access procedures, as described herein.

FIG. 1 is a diagram illustrating an exemplary environment 100 in which an exemplary embodiment of radio access management service may be implemented. As illustrated, environment 100 includes an access network 105 and an external network 115. Access network 105 includes access devices 107 (also referred to individually or generally as access device 107). External network 115 includes external devices 117 (also referred to individually or generally as external device 117). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (S S7), etc.), a core network, or another type of network that may support a wireless service and/or an application service, as described herein.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into distinct types of network architectures (e.g., Software Defined Networking (SDN), virtual, logical, network slice, etc.). The number, the type, and the arrangement of network devices are exemplary.

Environment 100 includes communication links between network devices, between a network and an end device, and so forth. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. According to various exemplary implementations, the interface of a device may be a service-based interface, a reference point-based interface, an Open Radio Access Network (O-RAN) interface, a 5G interface, another generation of interface (e.g., Sixth Generation (6G), Seventh Generation (7G), etc.), or some other type of network interface.

Access network 105 may include one or multiple networks of one or multiple types and technologies. For example, access network 105 may be implemented to include a 5G RAN, a future generation RAN (e.g., a 6G RAN, a 7G RAN, or a subsequent generation RAN), a centralized-RAN (C-RAN), an O-RAN, and/or another type of access network. Access network 105 may include a legacy RAN (e.g., a Fourth Generation (4G) or 4.5 RAN, etc.). Access network 105 may communicate with and/or include other types of access networks, such as, for example, a Wi-Fi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105.

Access network 105 may include different and multiple functional splitting, such as options 1, 2, 3, 4, 5, 6, 7, or 8 that relate to combinations of access network 105 and a core network including an Evolved Packet Core (EPC) network and/or an NG core (NGC) network (not illustrated), or the splitting of the various layers (e.g., physical layer, media access control (MAC) layer, radio link control (RLC) layer, and packet data convergence protocol (PDCP) layer, etc.), plane splitting (e.g., user plane, control plane, etc.), interface splitting (e.g., F2-U, F2-C, E2, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), carrier aggregation (CA) (e.g., intra-band, inter-band, contiguous, non-contiguous, etc.), edge and core network slicing, coordinated multipoint (CoIVIP), various duplex schemes (e.g., frequency division duplex (FDD), time division duplex (TDD), half-duplex FDD (H-FDD), etc.), and/or another type of connectivity service (e.g., NSA new radio (NR), SA NR, etc.).

According to some exemplary embodiments, access network 105 may be implemented to include various architectures of wireless service, such as, for example, macrocell, microcell, femtocell, picocell, metrocell, NR cell, Long Term Evolution (LTE) cell, non-cell, or another type of cell architecture. Additionally, according to various exemplary embodiments, access network 105 may be implemented according to various wireless technologies (e.g., radio access technologies (RATs), etc.), and various wireless standards, frequencies, bands, and segments of radio spectrum (e.g., centimeter (cm) wave, millimeter (mm) wave, below 6 gigahertz (GHz), above 6 GHz, higher than mm wave, licensed radio spectrum, unlicensed radio spectrum, above mm wave), and/or other attributes or technologies used for radio communication. Additionally, or alternatively, according to some exemplary embodiments, access network 105 may be implemented to include various wired and/or optical architectures for wired and/or optical access services.

Depending on the implementation, access network 105 may include one or multiple types of network devices, such as access devices 107. For example, access device 107 may include a gNB, an evolved Long Term Evolution (eLTE) evolved Node B (eNB), an eNB, a radio network controller (RNC), a remote radio head (RRH), a baseband unit (BBU), a radio unit (RU), a remote radio unit (RRU), a centralized unit (CU), a CU-control plane (CP), a CU-user plane (UP), a distributed unit (DU), a small cell node (e.g., a picocell device, a femtocell device, a microcell device, a home eNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Additionally, or alternatively, access device 107 may include a wired and/or optical device (e.g., modem, wired access point, optical access point, Ethernet device, etc.) that provides network access. According to some exemplary implementations, access device 107 may include a combined functionality of multiple RATs (e.g., 4G and 5G functionality, 5G and 5.5G functionality, etc.) via soft and hard bonding based on demands and needs. According to some exemplary implementations, access device 107 may include an integrated functionality, such as a CU-CP and a CU-UP, or other integrations of split RAN nodes. Access device 107 may be an indoor device or an outdoor device.

According to various exemplary implementations, access device 107 may include one or multiple sectors or antennas. The antenna may be implemented according to various configurations, such as single input single output (SISO), single input multiple output (SIMO), multiple input single output (MISO), multiple input multiple output (MIMO), massive MIMO, three dimensional (3D) and adaptive beamforming (also known as full-dimensional agile MIMO), tow dimensional (2D) beamforming, antenna spacing, tilt (relative to the ground), radiation pattern, directivity, elevation, planar arrays, and so forth. Depending on the implementation, access device 107 may provide a wireless access service at a cell, a sector, a sub-sector, carrier, and/or other configurable level.

According to an exemplary embodiment, at least some of access devices 107 include logic of the radio access management service, as described herein. For example, access device 107 may receive radio access management service information from external device 117. For example, the radio access management service information may include a predicted number of end devices 130 that may be supported (e.g., L) by reserved resources within a prospective time window associated with access and uplink transmission grant and potentially other calculated values by external device 117, as described herein. Access device 107 may compare the predicted number of end devices 130 to a total number of end devices 130. Based on a result, access device 107 may generate and transmit (e.g., multicast or broadcast) an access and transmission grant message directed to end devices 130, as described herein. For example, a single access and transmission grant message may be transmitted to a group of mIoT devices of a given radio coverage area (e.g., cell, sector, subsector). The access and transmission grant message may include both RA response information (e.g., an RA preamble identifier, time alignment information, and uplink grant information) and contention resolution information (e.g., scheduled uplink transmission grant) for each of the mIoT devices. Upon receipt, end devices 130 may transmit uplink data via access device 107 toward a given destination device. According to other exemplary embodiments, access device 107 may include, in whole or in part, other logic of the radio access management service, such as the ML/AI service provided by external device 117, as described herein.

External network 115 may include one or multiple networks of one or multiple types and technologies that provide an application service. For example, external network 115 may be implemented using one or multiple technologies including, for example, network function virtualization (NFV), software defined networking (SDN), cloud computing, Infrastructure-as-a-Service (IaaS), Platform-as-a-Service (PaaS), Software-as-a-Service (SaaS), or another type of network technology. External network 115 may be implemented to include a cloud network, a private network, a public network, a multi-access edge computing (MEC) network, a fog network, the Internet, a packet data network (PDN), a service provider network, the World Wide Web (WWW), an Internet Protocol Multimedia Subsystem (IMS) network, a Rich Communication Service (RCS) network, a software-defined (SD) network, a virtual network, a packet-switched network, a data center, or another type of network that may provide access to and may host an end device application service.

Depending on the implementation, external network 115 may include various network devices such as external devices 117. For example, external devices 117 may include network devices that host one or multiple types of application services. The application services may pertain to broadband services in dense areas (e.g., pervasive video, smart office, operator cloud services, video/photo sharing, etc.), broadband access everywhere (e.g., 50/100 Mbps, ultra-low-cost network, etc.), enhanced mobile broadband (eMBB), higher user mobility (e.g., high speed train, remote computing, moving hot spots, etc.), IoTs/mIoTs (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, massive machine-type communications (mMTC), voice, video streaming, and/or other types of wireless and/or wired application services. External devices 117 may also include other types of network devices that support the operation of external network 115 and the provisioning of application services, such as an orchestrator, an edge manager, an operations support system (OSS), a local domain name system (DNS), registries, and/or external devices 117 that may pertain to various network-related functions (e.g., security, management, charging, billing, authentication, authorization, policy enforcement, development, etc.). External devices 117 may include virtual, non-virtual, logical, and/or physical network devices.

According to an exemplary embodiment, at least some of external devices 117 include logic of the radio access management service. For example, a portion of the external devices 117 may provide the ML/AI service, as described herein. For example, referring to FIG. 2A, external device 117 may include a collector 205, a trainer 210, and a predictor 215. According to other exemplary embodiments, external device 117 may include additional, different, and/or fewer components that may provide the ML/AI service. A link 220 may communicatively couple two of more components, such as collector 205, trainer 210, and predictor 215. For example, link 220 may be implemented as a hardware link (e.g., a bus, a shared memory space, etc.), a software link (e.g., inter-process communication (IPC), etc.) or some other type of communicative link (e.g., an application programming interface (API), a wired connection, an optical connection, a wireless connection, etc.). The number, type, and arrangement of components and links are exemplary.

Collector 205 may include logic that collects or obtains various types of data from access device 107 and end device 130. According to some exemplary embodiments, access device 107 may forward data associated with end device 130 to collector 205. According to various exemplary implementations, the data obtained by collector 205 may be raw data or processed data. In this regard, according to various exemplary embodiments, collector 205 may or may not include logic that processes the data, such as formatting data (e.g., transforming raw data into a particular format, etc.), compressing and/or decompressing data, adding data, deleting data, encrypting and/or decrypting data, classifying data, organizing data, and so forth.

According to an exemplary embodiment, the data may include date and timestamp information and/or a device identifier that identifies a device (e.g., end device 130, access device 107) from which the data originates. According to various exemplary embodiments, the data may include values of parameters relating to performance metrics and/or other types of metrics, as described herein. For example, the values may relate to latency, throughput, error rate, reliability, packet loss, guaranteed flow bit rate (GFBR), guaranteed bit rate (GBR), non-GBR, maximum/minimum bit rate, response time, channel quality indicator (CQI), signal-to-noise ratio (SNR), a QoS Class Identifier (QCI) (e.g., 5G, LTE, etc.), Access Point Name-Aggregate Maximum Bit Rate (APN-AMBR), a UE-AMBR, Reflective QoS Attribute (RQA), Packet Delay Budget, priority level, Maximum Data Burst Volume (MDBV), reference signal received quality (RSRQ), reference signal received power (RSRP), received signal strength indicator (RSSI), end device velocity, and/or another type of key performance indicator (KPI), Quality of Experience (QoE), quality of service (QoS), service level agreement (SLA), and/or Mean Opinion Score (MOS). According to some exemplary embodiments, access device 107 may provide the number of end devices 130 (e.g., total) and/or the number of end devices 130 of a type (e.g., mIoT versus non-IoT) to which access device 107 provides radio access.

Trainer 210 may include logic that creates, trains, retrains, tunes, and/or updates a model (e.g., a prediction model, an AI model, an ML model, a learning-based model, a custom model, etc.) using the data (e.g., data from collector 205, historical data, training data, etc.) and training records using an ML algorithm, an AI algorithm, a deep learning algorithm, or the like, as described herein.

Predictor 215 may include logic that includes predictive analytics. For example, predictor 215 may include a model that may be implemented as a Long Short-Term Memory network, Random Forest, a Support Vector Machine, a Deep Boltzmann Machine, a Deep Belief Network, a Convolutional Neural Network, a Recurrent Neural Network, a Decision Tree, a Dense Neural Network, Naïve Bayes, another type of learning-based algorithm, and/or a non-learning-based algorithm/rule-based logic. According to various exemplary implementations, the learning algorithm may include a supervised learning algorithm, an unsupervised learning algorithm, and/or a reinforcement learning algorithm. Predictor 215 may predict various values associated with the metrics of the data collected, which may be used to calculate resource reservation and/or pre-allocation, as described herein.

Figure 2B:
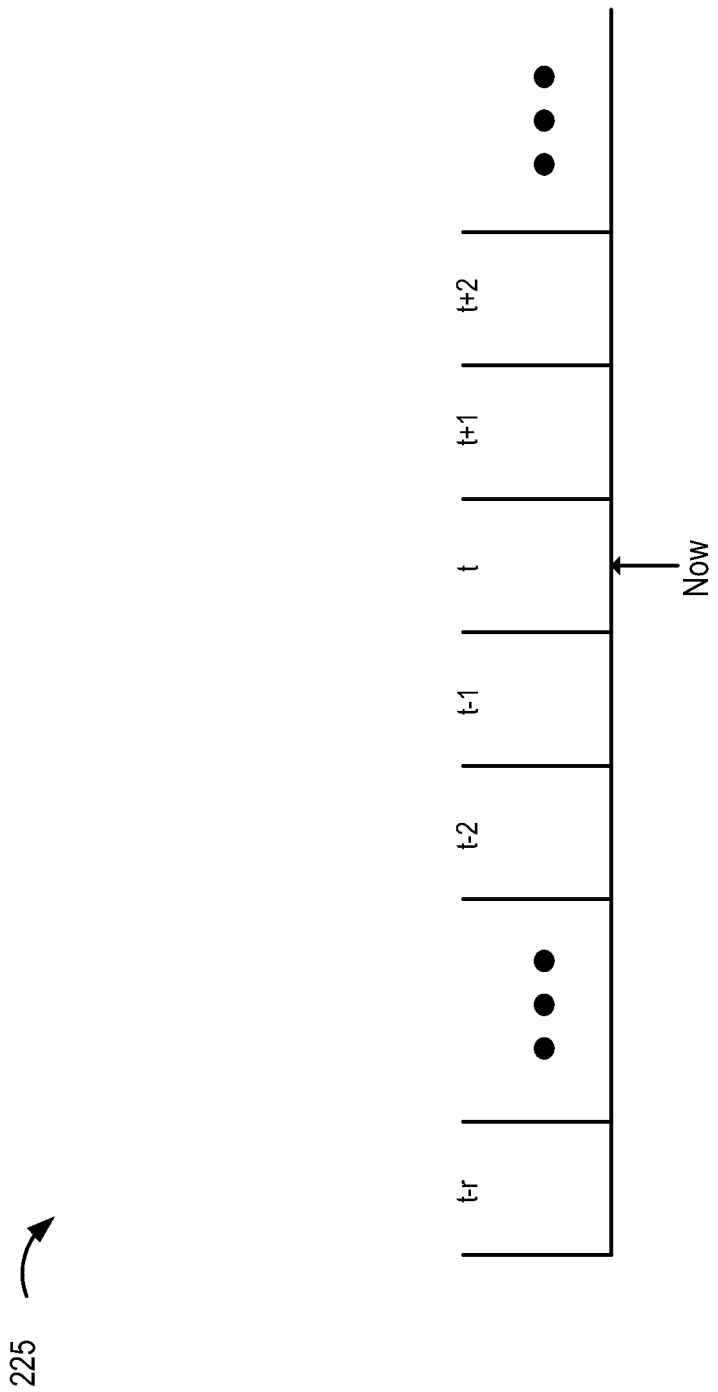
FIG. 2B is a diagram illustrating exemplary time windows pertaining to an exemplary embodiment of the radio access management service.

According to some exemplary embodiments, the ML/AI service may use a time window method approach in which data may be collected and used to calculate resource reservations for end devices, such as IoT devices, as described herein. For example, referring to FIG. 2B, for each time window Tt (e.g., t−r, ... t−2, t−1, t, t+1, t+2, etc.) of a series of exemplary time windows 225, the radio resource management service may collect the data, calculate predictive metric values, calculate a reservation or pre-allocation of radio resources for end devices 130 associated with access device 107 based on the predictive metric values, and provide a grant message to end devices 130 as a part of a radio access process.

According to an exemplary embodiment of the radio access management service, at each time window $T_t$, external device 117 may calculate a total radio capacity between access device 107 and end devices 130. For example, external device 117 may calculate an estimate of an available total channel capacity of a radio access link between access device 107 and end devices 130. The total radio channel capacity ($C_{Total}$) may be calculated based on a bandwidth B associated with access device 107, a received average signal power S, an average noise power N, and the number of antennas K, such as SISO, SIMO, MISO, and MIMO. According to an exemplary implementation, the channel capacity may be approximated according to a noise model, such as an additive white Gaussian noise (AWGN) model based on the Shannon Hartley Theorem, and according to the following exemplary expressions:

$$C_{Total}=B*\log_2(1+SNR) \text{ for SISO} \quad (1)$$

$$C_{Total}=B*\log_2(1+K*SNR) \text{ for SIMO and MISO} \quad (2)$$

$$C_{Total}=K*B*\log_2(1+SNR) \text{ for MIMO} \quad (3),$$

where SNR=S/N.

The total channel capacity $C_{Total}$ may pertain to multiple types of end devices 130. For example, $C_{Total\_IoT}$ may indicate a total channel capacity for IoT devices (e.g., in a mIoT context) and $C_{Total\_non\_IoT}$ may indicate a total channel capacity for non-IoT devices. According to such an example, the total channel capacity ($C_{Total}$) may be calculated based on the exemplary expression:

$$C_{Total}=C_{Total\_IoT}+C_{Total\_Non\_IoT} \quad (4).$$

According to other exemplary embodiments, the total radio channel capacity may be calculated based on other known methods, parameters, and/or expressions.

According to an exemplary embodiment of the radio access management service, external device 117 may calculate a total predicted metric that may be used by end devices 130 (e.g., IoT and non-IoT devices). For example, the predicted metric may be implemented as throughput (TP). According to an exemplary expression, the total predicted metric may be calculated based on the following exemplary expression:

$$TP_{Total}=TP_{Total\_IoT}+TP_{Total\_Non\_IoT} \quad (5).$$

According to an exemplary embodiment of the radio access management service, external device 117 may calculate an average for the predicted metric that may be provided. For example, external device 117 may calculate an average throughput ($TP_{Avg\_IoT}$) that may be provided for each IoT device according to the following exemplary expression:

$$TP_{Avg\_IoT}=TP_{Total\_IoT}/M \quad (6),$$

where M is a total number of a type of end device 130 (e.g., IoT, mIoT).

According to an exemplary embodiment of the radio access management service, external device 117 may calculate the resources that are available for end devices 130. For example, according to an IoT and non-IoT context, a total resource allocation for all IoT devices may be calculated according to the following exemplary expression:

$$C_{Total\_IoT} = C_{Total} * (TP_{Total\_IoT}/TP_{Total}) \quad (7)$$

and the total resource allocation for all non-IoT devices may be calculated according to the following exemplary expression:

$$C_{Total\_Non\_IoT} = C_{Total} * (TP_{Total\_Non\_IoT}/TP_{Total}) \quad (8)$$

According to an exemplary embodiment of the radio access management service, external device 117 may calculate the number of end devices 130 that may be supported. For example, according to the IoT and non-IoT context, the number of IoT devices that may be supported may be calculated based on the following exemplary expression:

$$L = \text{floor}(C_{Total\_IoT}/TP_{Avg\_IoT}) \quad (9),$$

In which L is the number of IoT devices that may be supported, and floor ( ) is a function that returns the largest integer that may be less than or equal to a given number (e.g., floor (2.1)=floor (2.9)=2). External device 117 may generate and transmit radio resource management information to access device 107 in accordance with the calculations described herein, for example.

According to an exemplary embodiment of the radio access management service, access device 107, in response to receiving the radio resource management information, may generate and transmit an access grant message to end devices 130, as described herein. For example, according to the IoT and non-IoT device context, access device 107 may transmit (e.g., multicast or broadcast) an access grant message according to the following. If L≥M, then transmit the access grant message to all (or M) IoT devices; and if L<M, then transmit the access grant message to L IoT devices, and for (M−L) IoT devices, determine if the resources are available from the non-IoT capacity ($C_{Total\_Non\_IoT}$). If the resources are available, then access device 107 may transmit the access grant message to (M−L) IoT devices or as many as possible up to M−L.

End device 130 includes a device that may have communication capabilities (e.g., wireless, wired, optical, etc.). End device 130 may or may not have computational capabilities. End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a phablet, a wearable device (e.g., a watch, glasses, etc.), a computer, a gaming device, a music device, an IoT device, a drone, a smart device, a fixed wireless device, a router, a sensor, an automated guided vehicle (AGV), an industrial robot, or other type of wireless device (e.g., other type of UE). End device 130 may be configured to execute various types of software (e.g., applications, programs, etc.). The number and the types of software may vary among end devices 130. End device 130 may include "edge-aware" and/or "edge-unaware" application service clients. For purposes of description, end device 130 is not considered a network device. End device 130 may include a DS-TT.

Figure 3:
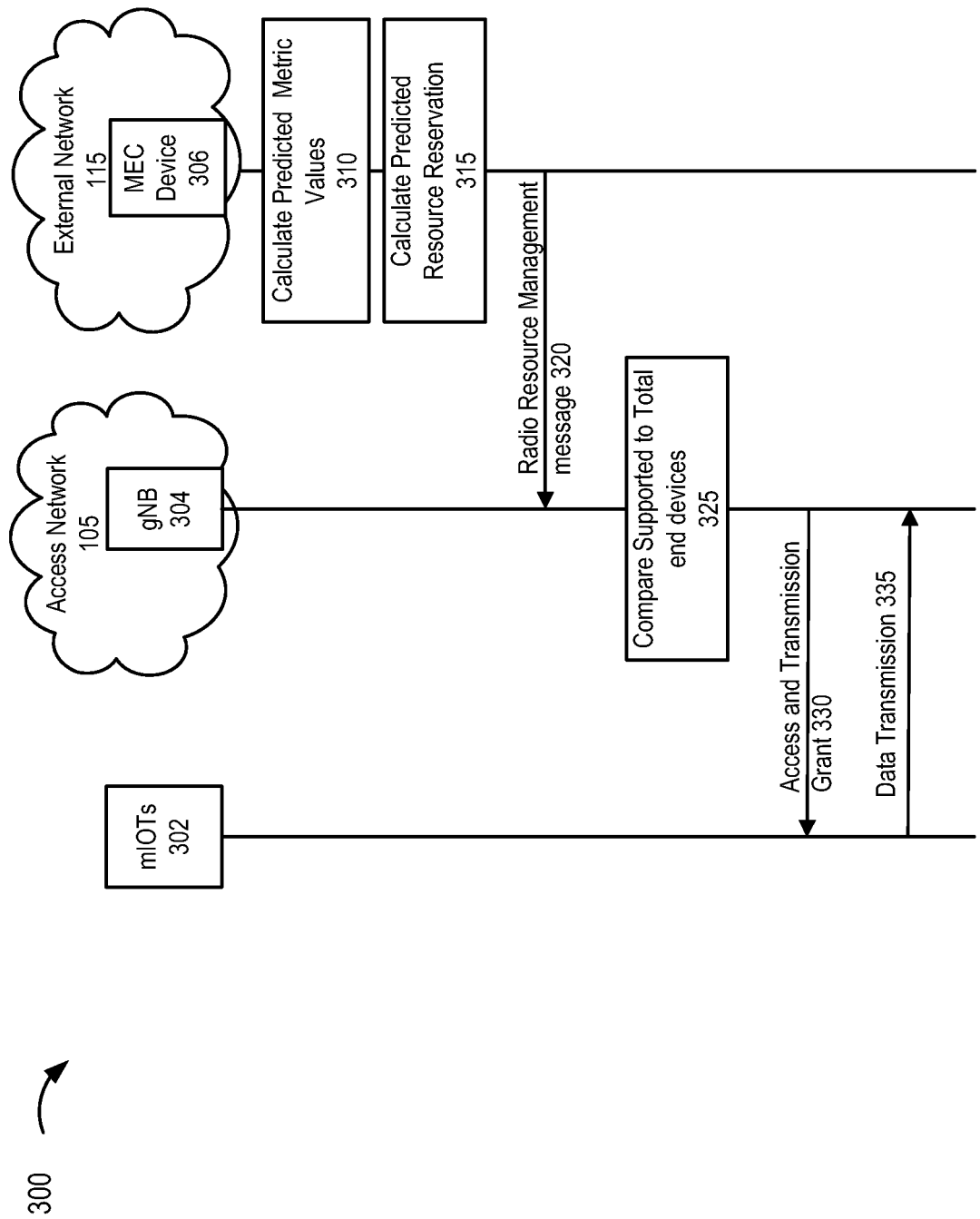
FIG. 3 is a diagram illustrating an exemplary process of an exemplary embodiment of the radio access management service.

FIG. 3 is a diagram illustrating an exemplary process 300 of an exemplary embodiment of the radio access management service according to an exemplary scenario. As illustrated, process 300 may be implemented in an environment that includes end devices 130 (e.g., mIoT devices 302), access device 107 (e.g., gNB 304) and an external device 117 (e.g., MEC device 306). As described in relation to FIG. 1, according to other exemplary embodiments, the environment may include another type of access device 107 and/or external device 117 not specifically illustrated and described in FIG. 3. According to some exemplary embodiments, MEC device 306 may be co-located with or geographically near to gNB 304.

Referring to FIG. 3, MEC device 306 may collect metric data (e.g., metric data pertaining to mIoTs 302 and gNB 304) and calculate 310 predicted metric values, as described herein. Based on the predicted metric values, MEC device 306 may calculate 315 predicted resource reservation for a time window pertaining to an RA process, as described herein. In response to the calculation, MEC device 306 may transmit 320 radio resource management service information to gNB 304. For example, the radio resource management service information may include an L value (e.g., the number of IoT devices that may be supported), as described, and potentially other calculated values associated with the predicted resource reservation operation. In response to receiving the radio resource management service information, gNB 304 may compare 325 the L value to the total number of IoT devices (e.g., an Mvalue). For example, if a result of the comparison indicates that L≥M, then gNB 304 may provide access and transmission grants to all or M IoT devices. According to another example, if a result of the comparison indicates L<M, then gNB 304 may provide access and transmission grants to L IoT devices, and for (M−L) IoT devices, gNB 304 may determine whether resources associated with non-IoT devices (e.g., $C_{Total\_Non\_IoT}$) are available. When available, gNB 304 may provide access and transmission grants to (M−L) IoT devices or as many as possible up to (M−L).

Based on a result of the comparison, gNB 304 may transmit 330 an access and transmission grant. The access and transmission grant may include both RA response information (e.g., an RA preamble identifier, time alignment information, and uplink grant information) and contention resolution information (e.g., scheduled uplink transmission grant) for at least L mIoTs 302, as described herein. gNB 304 may multicast or broadcast the access and transmission grant. In response, mIoTs 302 may transmit uplink data/data transmission 335 to gNB 304.

The messages and operations illustrated and described are exemplary. According to other exemplary embodiments, process 300 may include additional and/or different messages not specifically described and illustrated. According to other exemplary embodiments and scenarios, process 300 may include additional operations, fewer operations, and/or different operations that may be performed. For example, one or more operations performed by MEC device 306 may be performed by gNB 304.

Figure 4:
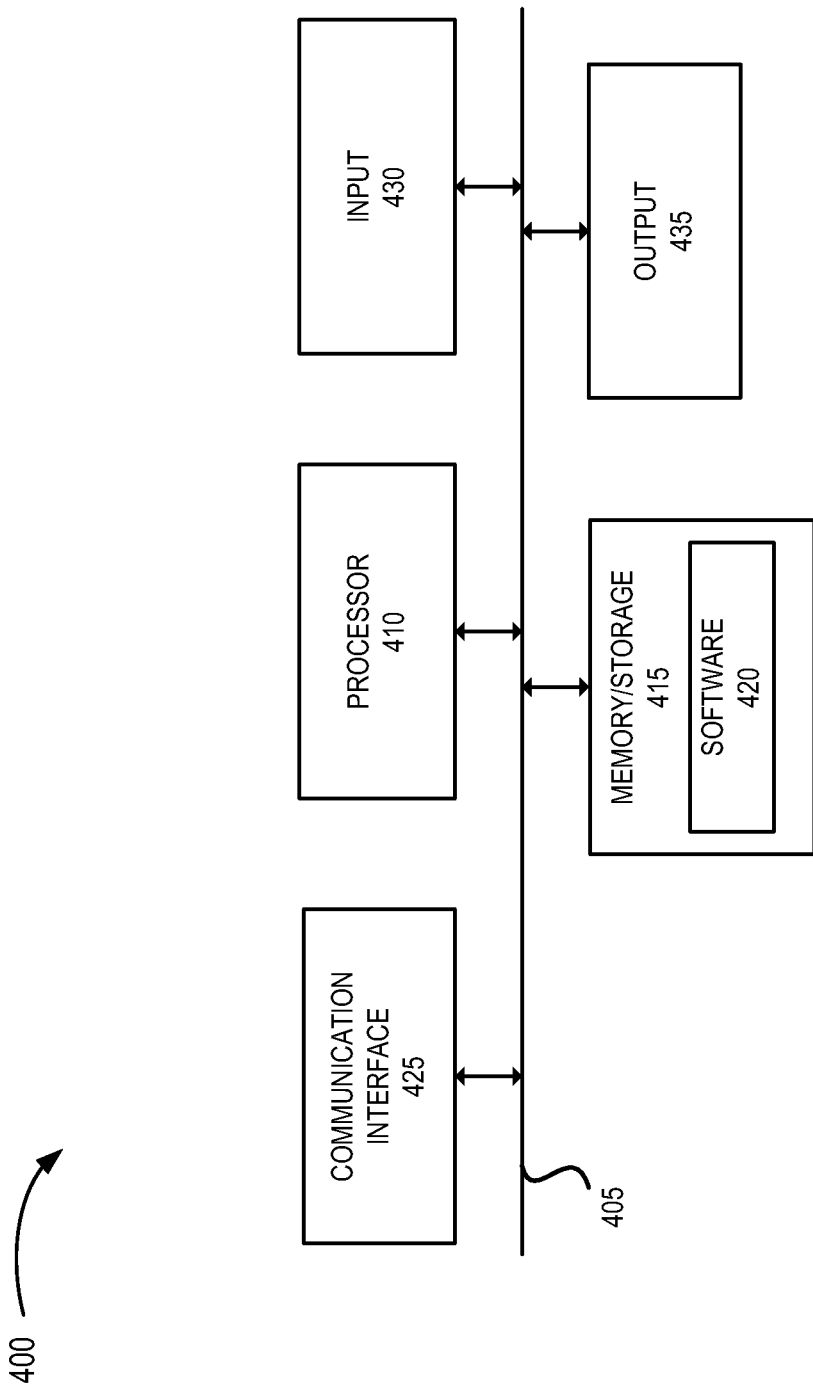
FIG. 4 is a diagram illustrating exemplary components of a device that may correspond to one or more of the devices illustrated and described herein.

FIG. 4 is a diagram illustrating exemplary components of a device 400 that may be included in one or more of the devices described herein. For example, device 400 may correspond to access device 107, external device 117, end device 130, mIoTs 302, gNB 304, MEC device 306, and/or other types of devices, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation, or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, learning, model-based, etc.

Memory/storage 415 includes one or multiple memories and/or one or multiple other types of storage mediums. For example, memory/storage 415 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 415 may be external to and/or removable from device 400, such as, for example, a Universal Serial Bus (USB) memory stick, a dongle, a hard disk, mass storage, off-line storage, or some other type of storing medium. Memory/storage 415 may store data, software, and/or instructions related to the operation of device 400.

Software 420 includes an application or a program that provides a function and/or a process. As an example, with reference to MEC device 306, software 420 may include an application that, when executed by processor 410, provides a function and/or a process of radio access management service, as described herein. Additionally, for example, with reference to gNB 304, software 420 may include an application that, when executed by processor 410, provides a function and/or a process of radio access management service, as described herein. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces, optical interfaces, and/or wired interfaces. For example, communication interface 425 may include one or multiple transmitters and receivers, or transceivers. Communication interface 425 may operate according to a protocol stack and a communication standard.

Input 430 permits an input into device 400. For example, input 430 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 400 may be implemented in the same manner. For example, device 400 may be instantiated, created, deleted, or some other operational state during its life-cycle (e.g., refreshed, paused, suspended, rebooting, or another type of state or status), using well-known virtualization technologies. For example, access device 107, core device 122, external device 117, and/or another type of network device or end device 130, as described herein, may be a virtualized device.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a function or a process described herein. Alternatively, for example, according to other implementations, device 400 performs a function or a process described herein based on the execution of hardware (processor 410, etc.).

Figure 5:
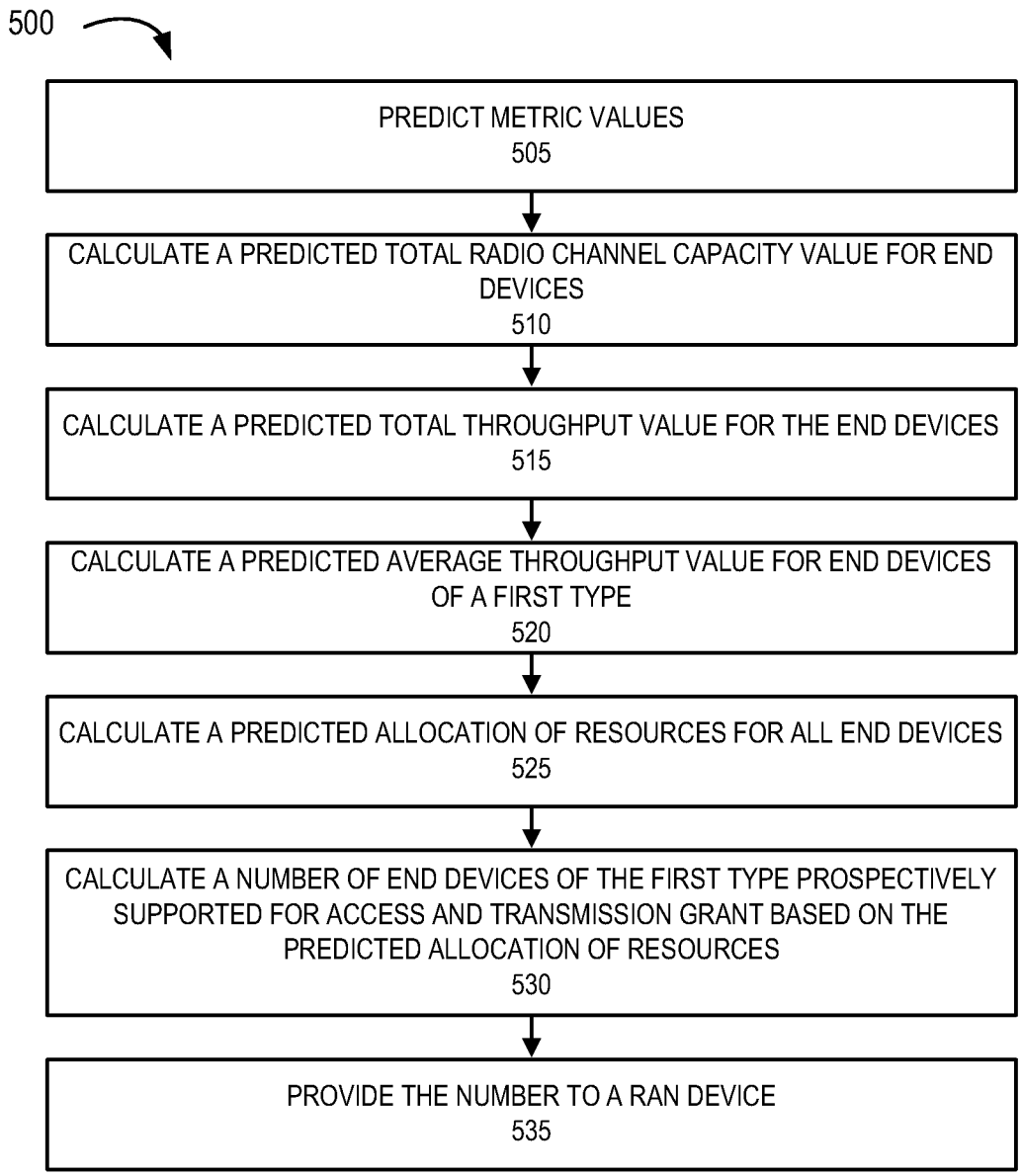
FIG. 5 is a flow diagram illustrating an exemplary process of an exemplary embodiment of the radio access management service.

FIG. 5 is a flow diagram illustrating an exemplary process 500 of an exemplary embodiment of the radio access management service. According to an exemplary embodiment, a MEC device or similar AI/ML predictive device may perform a step of process 500. According to an exemplary implementation, processor 410 executes software 420 to perform a step of process 500, as described herein. Alternatively, a step may be performed by execution of only hardware. For purposes of this description, process 500 is described as performed by a predictive device, such as MEC device 306. According to an exemplary embodiment, process 500 may be performed in whole or in part as a part of a radio access procedure.

In block 505, a predictive device may predict metric values. For example, the predictive device may collect various data from end devices 130 and access device 107 of relevance and calculate predicted metric values associated with a future time window, as described herein. The predicted metric values may be relative to a particular radio coverage area of access device 107 (e.g., cell, sector, sub-sector, etc.).

In block 510, the predictive device may calculate a predicted total radio channel capacity value for all end devices. For example, the predictive device may identify an antenna characteristic associated with access device 107, and estimate a total radio channel capacity value based on the identified antenna characteristic and the future time window, as described herein. The predictive device may identify different types or categories of end devices 130 and calculate a total radio channel capacity value for each type, as described herein.

In block 515, the predictive device may calculate a predicted total throughput value for all end devices. For example, the predictive device may calculate a predicted throughput value available within the future time window relative to end devices 130.

In block 520, the predictive device may calculate a predicted average throughput value for end devices of a first type. For example, the predictive device may calculate the predicted average throughput value for end devices 130 of the first type (e.g., IoTs, mIoTs, or the like) based on the predicted throughput value and the future time window, as described herein.

In block 525, the predictive device may calculate a predicted allocation of resources for all end devices. For example, the predictive device may calculate the predicted allocation of resources for the end devices based on the predicted total radio channel capacity value and the predicted total throughput value, as described herein. The predictive device may calculate the predicted allocation of resources for each end device type, as described herein.

In block 530, the predictive device may calculate a number of end devices of the first type prospectively supported for access and transmission grant based on the predicted allocation of resources. For example, the predictive device may calculate the number of end devices 130 based on the predicted allocation of resources and the predicted average throughput value pertaining to end devices 130 of the first type, as described herein.

In block 535, the predictive device may provide the number to a RAN device. For example, the predictive device may generate and transmit radio access management service information, which may include the number of end devices 130 and other values calculated (e.g., $C_{Total\_Non\_IoT}$, etc.), to access device 107.

FIG. 5 illustrates an exemplary process of the radio access management service, according to other exemplary embodiments, the radio access management service may perform additional operations, fewer operations, and/or different operations than those illustrated and described. For example, the predictive device may perform one or more operations of process 600, such as the comparing step and the generating step, as described herein.

Figure 6:
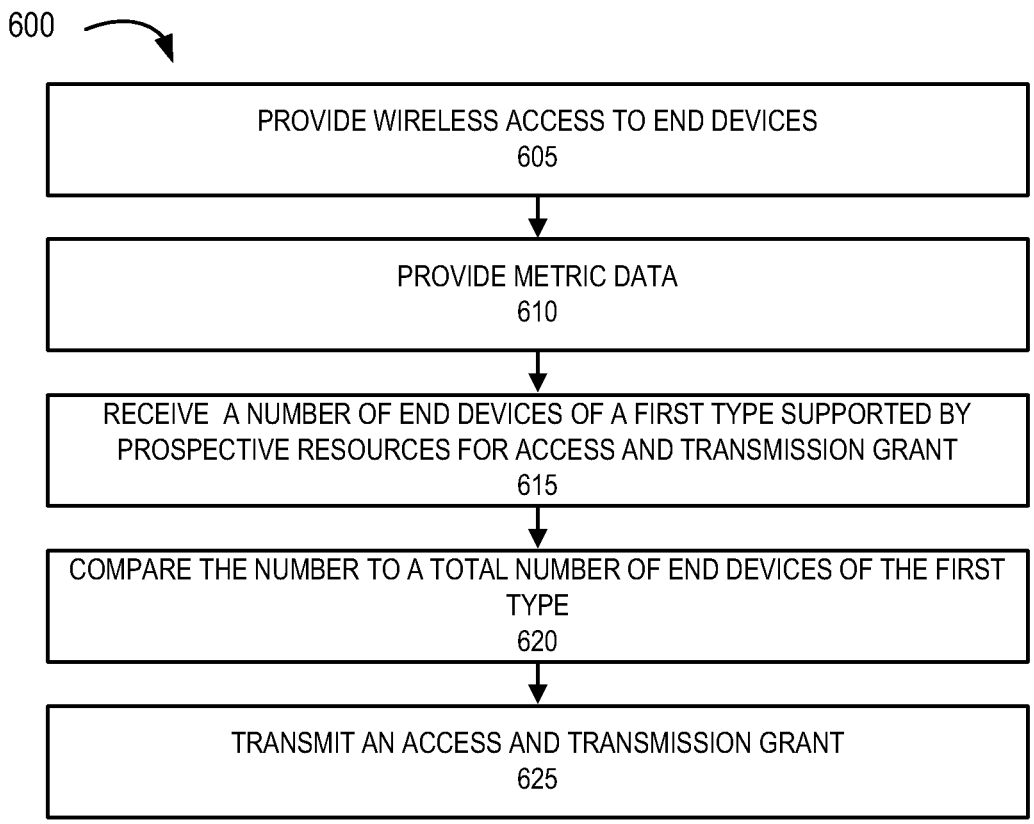
FIG. 6 is a flow diagram illustrating another exemplary process of an exemplary embodiment of the radio access management service.

FIG. 6 is a flow diagram illustrating another exemplary process 600 of an exemplary embodiment of the radio access management service. According to an exemplary embodiment, access device 107 may perform a step of process 600. According to an exemplary implementation, processor 410 executes software 420 to perform a step of process 600, as described herein. Alternatively, a step may be performed by execution of only hardware. According to an exemplary embodiment, process 600 may be performed in whole or in part as a part of a radio access procedure.

In block 605, access device 107 may provide wireless access to end devices 130. For example, access device 107 may provide radio access for mIoT devices. According to some examples, access device 107 may provide radio access to non-IoT devices. End devices 130 may be attached to access device 107.

In block 610, access device 107 may provide metric data. For example, access device 107 may provide or make available metric data (e.g., CQI, SNR, RSRP, throughput, etc.) to a predictive device (e.g., ML/AI device, such as external device 117), as described herein. Access device 107 may also make available metric data associated with end devices 130 (e.g., mIoT devices, non-mIoT devices, etc.).

In block 615, access device 107 may receive a number of end devices of a first type supported by prospective resources for access and transmission grant. For example, access device 107 may receive radio access management service information (e.g., L value) from the predictive device. The radio access management service information may include other types of calculated values, as described herein.

In block 620, access device 107 may compare the number to a total number of end devices of the first type. For example, access device 107 may compare the L value to an M value (e.g., indicating the total number of mIoT devices), as described herein. For example, if a result of the comparison indicates that L≥M, then in block 625 as described, access device 107 may provide access and transmission grants to all or M IoT devices. According to another example, if a result of the comparison indicates L<M, then access device 107 may provide access and transmission grants to L IoT devices, and for (M−L) IoT devices, access device 107 may determine whether resources associated with non-IoT devices (e.g., C Total Non-IoT) are available. When available, access device 107 may provide access and transmission grants to (M−L) IoT devices or as many as possible up to (M−L).

In block 625, access device 107 may transmit an access and transmission grant. For example, access device may generate the access and transmission grant based on a result of the comparison, as described herein. The access and transmission grant may include both RA response information (e.g., an RA preamble identifier, time alignment information, and uplink grant information) and contention resolution information (e.g., scheduled uplink transmission grant) for at least L end devices 130, as described herein. Access device 107 may multicast or broadcast a single access and transmission grant. According to an exemplary embodiment, in contrast to a known RA process, end devices 130 may not transmit and access device 107 may not receive an RA request. Additionally, end devices 130 may not transmit and access device 107 may not receive a content request.

FIG. 6 illustrates an exemplary process of the radio access management service, according to other exemplary embodiments, the radio access management service may perform additional operations, fewer operations, and/or different operations than those illustrated and described. For example, according to an exemplary embodiment, access device 107 may include logic that provides ML/AI service logic, as described herein. According to such an embodiment, access device 107 may perform one or more steps of process 500 in combination with process 600.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks have been described regarding the processes illustrated in FIGS. 5 and 6, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   calculating, by a network device, predicted metric values pertaining to a random access and transmission grant procedure of end devices within a prospective time window;
   calculating, by the network device based on the predicted metric values, a predicted total throughput value and a predicted average throughput value for the end devices;
   calculating, by the network device based on the predicted total throughput value, a predicted total resource allocation value that supports the random access and transmission grant procedure;
   calculating, by the network device based on the predicted average throughput value, a first value indicating a number of end devices that can be prospectively supported for the random access and transmission grant procedure; and
   transmitting, by the network device based on the predicted total resource allocation value, a single random access and transmission grant message, which includes random access and contention resolution information, to the number of the end devices.

2. The method of claim 1, further comprising:
   calculating, by the network device, a predicted total radio channel capacity value pertaining to the network device and the end devices.

3. The method of claim 2, wherein the predicted total resource allocation value is calculated based on the predicted total radio channel capacity value.

4. The method of claim 1, wherein the first value is less than a second value that indicates a total number of the end devices.

5. The method of claim 1, further comprising:
   receiving, by the network device, at least one of a total number of the end devices or a total number of the end devices of a first type, wherein the end devices include end devices of the first type and a second type, and the first value indicates the number of the end devices of the first type.

6. The method of claim 1, wherein the first value is calculated based on a ratio between the predicted average throughput value and the predicted total resource allocation value.

7. The method of claim 1, wherein the end devices are massive Internet of Things (mIoT) devices that are attached to the network device.

8. The method of claim 1, wherein the network device is a radio access device of a radio access network.

9. A network device comprising:
a processor that is configured to:
calculate predicted metric values pertaining to a random access and transmission grant procedure of end devices within a prospective time window via a radio access network device;
calculate, based on the predicted metric values, a predicted total throughput value and a predicted average throughput value for the end devices;
calculate, based on the predicted total throughput value, a predicted total resource allocation value that supports the random access and transmission grant procedure;
calculate, based on the predicted average throughput value, a first value indicating a number of end devices that can be prospectively supported for the access and transmission grant; and
transmit, based on the predicted total resource allocation value, a single random access and transmission grant message, which includes random access and contention resolution information, to the number of the end devices.

10. The network device of claim 9, wherein the processor is further configured to:
calculate a predicted total radio channel capacity value pertaining to the network device and the end devices.

11. The network device of claim 10, wherein the predicted total resource allocation value is calculated based on the predicted total radio channel capacity value.

12. The network device of claim 9, wherein the processor is further configured to:
receive at least one of a total number of the end devices or a total number of the end devices of a first type, wherein the end devices include end devices of the first type and a second type, and the first value indicates the number of the end devices of the first type.

13. The network device of claim 9, wherein the first value is less than a second value that indicates a total number of the end devices.

14. The network device of claim 9, wherein the first value is calculated based on a ratio between the predicted average throughput value and the predicted total resource allocation value.

15. The network device of claim 9, wherein the end devices are massive Internet of Things (mIoT) devices that are attached to the network device.

16. The network device of claim 9, wherein the network device is a radio access device of a radio access network.

17. A non-transitory computer-readable storage medium storing instructions executable by a processor of a network device, wherein the instructions are configured to:
calculate predicted metric values pertaining to a random access and transmission grant procedure of end devices within a prospective time window;
calculate, based on the predicted metric values, a predicted total throughput value and a predicted average throughput value for the end devices;
calculate, based on the predicted total throughput value, a predicted total resource allocation value that supports the random access and transmission grant procedure;
calculate, based on the predicted average throughput value, a first value indicating a number of end devices that can be prospectively supported for the random access and transmission grant procedure; and
transmit, based on the predicted total resource allocation value, a single random access and transmission grant message, which includes random access and contention resolution information, to the number of the end devices.

18. The non-transitory computer-readable storage medium of claim 17, wherein the first value is calculated based on a ratio between the predicted average throughput value and the predicted total resource allocation value.

19. The non-transitory computer-readable storage medium of claim 17, wherein the end devices are massive Internet of Things (mIoT) devices that are attached to the network device.

20. The non-transitory computer-readable storage medium of claim 17, wherein the instructions further comprise instructions configured to:
calculate a predicted total radio channel capacity value pertaining to the network device and the end devices.

* * * * *